United States Patent [19]
Dean

[11] 4,097,063
[45] Jun. 27, 1978

[54] PNEUMATIC COIL SPRING SUPPORT FOR VEHICLES

[75] Inventor: Albert G. Dean, Narberth, Pa.

[73] Assignee: The Budd Company, Troy, Mich.

[21] Appl. No.: 754,873

[22] Filed: Dec. 27, 1976

[51] Int. Cl.² ............................................. B61F 3/08
[52] U.S. Cl. .................................. 280/712; 105/199 R
[58] Field of Search .................... 280/712; 105/197 B, 105/197 R, 199 R; 267/3

[56] References Cited

U.S. PATENT DOCUMENTS

| | | | |
|---|---|---|---|
| 3,491,702 | 1/1970 | Dean | 105/199 R |
| 3,774,550 | 11/1973 | Lich | 105/199 R |
| 4,029,021 | 6/1977 | Paul | 105/199 R |

*Primary Examiner*—Philip Goodman

[57] ABSTRACT

Pneumatic-coil series spring support means, as for vehicles, which substantially inhibits tilt of the pneumatic spring component, as by providing a rigid extension of the movable spring seat of the pneumatic spring component and hinging the remote end of the rigid seat extension to the member which carries the relatively fixed spring seat of the pneumatic spring component, leaving the coil spring component to take the required lateral movement of the combined spring support means; particularly for arrangements in which the pneumatic spring component is located below the coil spring component.

4 Claims, 3 Drawing Figures

PNEUMATIC COIL SPRING SUPPORT FOR VEHICLES

BACKGROUND

In a prior application to A. G. Dean, U.S. Pat. No. 3,491,702, issued Jan. 27, 1970, there is disclosed a series pneumatic-coil spring arrangement in which the lateral movement of the movable spring seat of the pneumatic spring component is restricted somewhat by a radius rod which is pivoted at both ends. In this patent, the lateral movement of the intermediate spring seat is restricted by the radius rod. This concentrates the lateral relilience to the coil spring. The vertical location of this radius rod counteracts the tendency to tilt this seat due to the lateral movement of the coil spring. It does not, however, prevent tilting due to vertical eccentricity of off-center location of the spring or variation in the constrction of the coil spring ends.

In a patent of Paul, assigned to the same assignee as the present U.S. Pat. No. 4,029,021, issued June 14, 1977, there is disclosed a reverse arrangement in which the pneumatic spring component is disposed lowermost on the truck bolster and the coil spring component is disposed uppermost under the body bolster; but again the intermediately connected radius rod is hinged at both ends and the pneumatic spring component can have more tilting movement than desired.

SYNOPSIS OF INVENTION

The present invention provides means for substantially preventing tilting movement of the pneumatic spring component in a series pneumatic-coil spring arrangement by providing an extensive rigid projection from the movable intermediate seat of the pneumatic spring component and hinging the outer end of the rigid projection to the member which carries the relatively fixed seat of the pneumatic spring component. This arrangement is particularly beneficial when the pneumatic spring component is disposed lowermost on the truck bolster and the coil spring component disposed uppermost above the pneumatic spring component.

DRAWINGS

The objects of the invention, as well as various features of novelty and advantages, will be apparent from the following description of an exemplary embodiment shown in the accompanying drawings, wherein.

SPECIFIC EMBODIMENT

Figure 1:
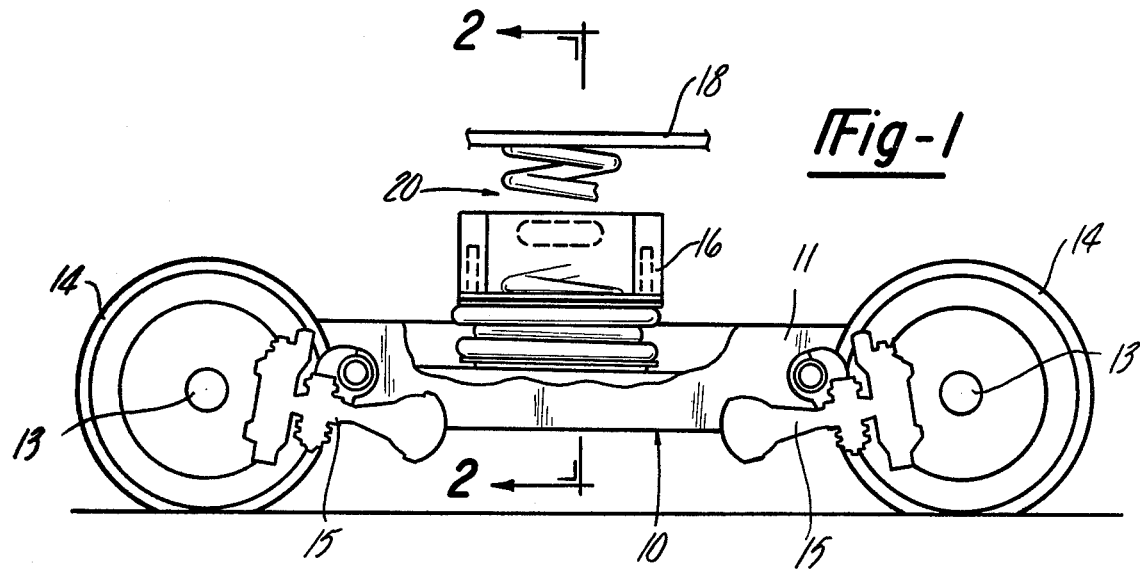
FIG. 1 is a side elevation of a railway truck provided with the improved spring arrangement.
Figure 2:
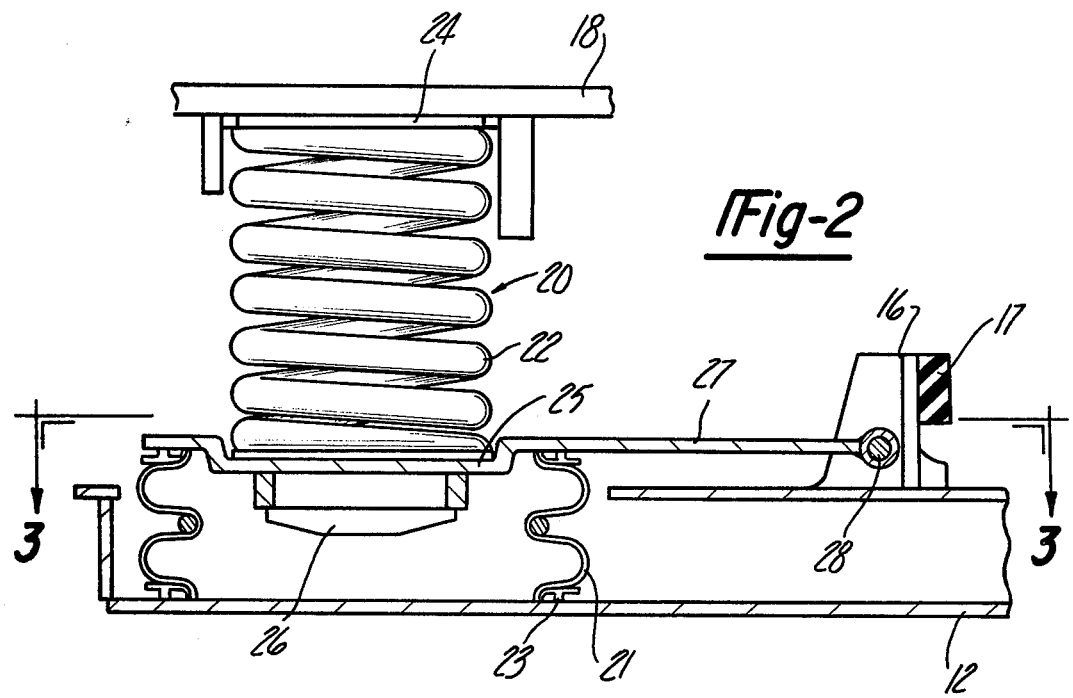
FIG. 2 is an enlarged vertical transverse section taken on the line 2—2 of FIG. 1.
Figure 3:
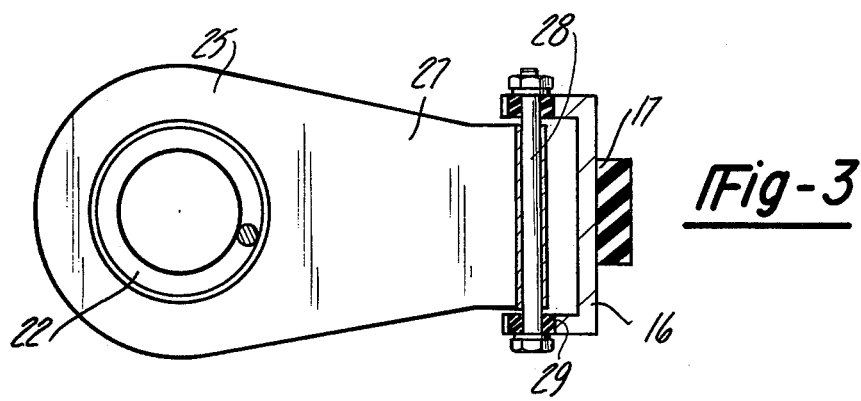
FIG. 3 is a reduced scale plan and section taken on the line 3—3 of FIG. 2.

The truck 10 with which the present spring arrangement is shown is of the type disclosed in the patent of W. B. Dean, U.S. Pat. No. 2,908,230, issued Oct. 13, 1959.

The truck comprises a frame with side beams or sills 11 and a truck bolster 12 carried by axles 13 and wheels 14 and having brake units generally denoted by the numeral 15. The truck bolster is provided with upstanding projections 16 carrying resilient bumpers 17. The car body is provided with a body bolster 18 which is supported at each end by a series pneumatic-coil spring unit generally denoted by the numeral 20.

The spring unit 20 comprises a pneumatic spring component 21 and a coil spring component 22, the pneumatic spring component here being disposed lowermost for greater stability and other beneficial effects, as explained in the Paul application, to which previous reference has been made. The relatively fixed spring seat 23 of the pneumatic spring component is on the truck bolster and the relatively fixed spring seat 24 of the coil spring component is on the body bolster. The intermediate spring seats of the pneumatic and coil components is provided on the dished seat plate 25. The seat plate 25 carries a stop bumper pad 26 to take the load if the pneumatic spring component should lose pressure.

The seat plate 25 has a relatively long rigid extension 27 which at the remote end is hinged at 28 to the upstanding side bumper projection 16 carried by the truck bolster. As here shown, the side bumper is provided with vertical side plates 16a carrying the pivot support but, obviously, the extension 27 could be divided and the connection arrangement reversed. The hinge connection is preferably provided with resilient bushings 29, as of an elastomeric material.

It is to be noted that the upper spring seat of the spring plate is made shallow, about the depth of the lowermost coil of the coil spring component, to avoid having a deep body of ice in cold weather since exposed to the weather.

In use the required side movements are provided by transverse deflection of the coil spring having its ends held substantially parallel. Internal coils will tilt to amplify this displacement but the spring seat tilt is limited and controlled to provide consistent and predictable characteristics. The pneumatic spring action is substantially limited to vertical displacement, which it is best suited to accommodate.

While one embodiment of the invention has been described for purposes of illustration, it is to be understood that there may be various embodiments and modifications within the general scope of the invention.

I claim:

1. Spring means for supporting a vehicle body on a truck, comprising in combination, a pneumatic-coil spring unit having end seats on the truck and vehicle body, said pneumatic-coil spring unit including pneumatic and coil spring components, an intermediate seat plate between said pneumatic and coil spring components of said spring unit, said intermediate seat plate having an elongated rigid lateral stay member including a pivotal connection on the remote end thereof, and pivotal mean secured to said truck for pivotally receiving said pivotal connection and said pivotal connection and pivotal means co-acting for permitting arcuate movement of said intermediate seat plate about said pivotal connection substantially in a vertical direction and restricting any other tilting movement of said pneumatic spring component.

2. Spring means for supporting a vehicle body as set forth in claim 1, in which said pneumatic spring component is mounted on the truck below the coil spring component.

3. Spring means for supporting a vehicle body as set forth in claim 1, the vehicle body having a body bolster and the truck having a truck bolster, with spring units supporting the body on fixed end spring seats near the ends of said body bolster and said spring units being supported on fixed end spring seats on said truck bolster, with the coil spring components providing the required lateral movements and the tilting movements of the pneumatic spring components limited by the elongated rigid seat extensions pivoted only at their remote ends to parts on the bolster which carry the fixed seats of the pneumatic spring components.

4. Spring means as set forth in claim 3, in which said pneumatic spring components are mounted on the truck bolster below the coil spring components.

* * * * *